United States Patent [19]

Proctor et al.

[11] Patent Number: 5,158,993
[45] Date of Patent: Oct. 27, 1992

[54] REINFORCED THERMOPLASTIC COMPOSITES

[75] Inventors: Michael G. Proctor; Johannes C. M. Jordaan, both of Badhuisweg, Netherlands

[73] Assignee: Shell Oil Company, Houston, Tex.

[21] Appl. No.: 747,898

[22] Filed: Aug. 19, 1991

[30] Foreign Application Priority Data

Sep. 6, 1990 [GB] United Kingdom ............... 9019513

[51] Int. Cl.$^5$ .................................................. C08K 9/06
[52] U.S. Cl. .................................... 523/212; 523/213; 523/214; 523/217; 523/400; 524/612
[58] Field of Search ............... 523/400, 212, 213, 214, 523/217; 524/612

[56] References Cited

U.S. PATENT DOCUMENTS

| | | | |
|---|---|---|---|
| 2,495,286 | 1/1950 | Brubaker | 260/63 |
| 3,694,412 | 9/1972 | Nozaki | 260/63 CQ |
| 3,914,391 | 10/1975 | Nozaki | 423/364 |
| 5,034,431 | 7/1991 | Hanley | 523/213 |
| 5,075,357 | 12/1991 | Enami et al. | 523/466 |

FOREIGN PATENT DOCUMENTS

| | | |
|---|---|---|
| 0121965 | 3/1984 | European Pat. Off. . |
| 0213671 | 8/1986 | European Pat. Off. . |
| 0229408 | 11/1986 | European Pat. Off. . |
| 0322959 | 12/1988 | European Pat. Off. . |
| 1081304 | 2/1966 | United Kingdom . |
| 9019513.2 | 9/1990 | United Kingdom . |

Primary Examiner—John Kight, III
Assistant Examiner—Richard L. Jones
Attorney, Agent, or Firm—James O. Okorafor

[57] ABSTRACT

A reinforced thermoplastic composite comprising a linear alternating polymer of at least one olefinically unsaturated compound and carbon monoxide, and a glass fiber reinforcement having a coating of a sizing material which consists essentially of aminosilane and uncured epoxy resin functionalities. Articles manufactured from this composition and a process for producing the composition are also disclosed.

14 Claims, No Drawings

REINFORCED THERMOPLASTIC COMPOSITES

FIELD OF THE INVENTION

The present invention relates to a reinforced thermoplastic composite and to a process for its preparation. More particularly the invention relates to such a composite based on linear alternating polyketone polymers reinforced with inorganic fibrous materials.

BACKGROUND OF THE INVENTION

Polymers of carbon monoxide and olefinically unsaturated organic compounds, or polyketones, have been known and available in limited quantities for many years. For example, polymers of ethylene or ethylene-propylene which contain small quantities of carbon monoxide are disclosed in U.S. Pat. No. 2,495,286, prepared using free radical catalysts. British Patent 1,081,304 discloses polymers containing higher concentrations of carbon monoxide prepared using alkylphosphine complexes of palladium salts as catalysts. A special class of linear polyketones is disclosed in U.S. Pat. No. 3,694,412, wherein the monomer units of carbon monoxide and olefinically unsaturated hydrocarbons occur in alternating order.

Polyketones are of considerable interest because they exhibit good physical properties. In particular, the high molecular weight linear alternating polymers have potential use as engineering thermoplastics due to their high strength, rigidity and impact resistance. These polymers consist of repeating units of general formula

which units may be the same or different and wherein A is the moiety obtained by polymerisation of the olefinically unsaturated organic compound through the olefinic unsaturation.

Although the properties of the polyketones are suitable for many applications, it would be of advantage to provide polyketone composites which exhibit less mould shrinkage and certain mechanical properties that are improved over the corresponding properties of the polymer alone.

EP-A-322959 describes a reinforced thermoplastic composite comprising a linear alternating polymer of at least one olefinically unsaturated compound and carbon monoxide, and a glass fiber reinforcement. Herein it is mentioned too that glass fibers that are to be used as a reinforcement in plastics, customarily have a coating of a sizing material. The chemical structure and the manner of deposition of such a sizing material on the glass fibers often is a manufacturer's secret; and most end users have grown accustomed to referring to the code name of the fiber manufacturer rather than to a chemical formula. Nevertheless a number of different chemical compounds are mentioned as suitable sizings in EP-A-322959, e.g. water emulsions of starch and lubricating oil, aqueous dispersions of surface active materials and lubricants, silicon-containing materials such as vinyl silanes, alkyltrimethoxysilanes, aminosilanes, trimethoxysilanes which may also contain urethane, acrylate or epoxy functionalities, and non-polar hydrocarbons. For use in glass fiber based composites, a preference is expressed for polar sizings having a trimethoxysilane end group attached to a hydrocarbon chain with a terminal urethane functionality, for instance the sizing used in the fibers sold by Owens Corning under the code name 492 AA.

Whereas the mechanical properties of such composites are quite satisfactory, they could still be improved. Another problem, up to now not recognised, is that certain sizings, by their very reactivity with the polymer molecules, cause cross-linking between different polymer molecules. This phenomenon does not occur in polymers like polyethylene or polypropylene, which lack any reactive (carbonyl) groups. If the suitability of a certain fiber-sizing combination for use in polyketone based composites is judged solely on the basis of impact strength and similar mechanical tests, as is customary for conventional polymers, the cross-linked polymer composites will appear very attractive, because of their high scores in such tests. However, as soon as such glass fiber reinforced composites have to be processed, e.g. extruded, from the melt, it is found that their melt viscosity is so high that they are practically improcessable. This phenomenon of cross-linking was found to occur inter alia with the polar sizing recommended in EP-A-322959, and has now been found to occur with many other sizing.

It was recently found by the Applicant that a method to improve the performance of such polyketone composites is to incorporate reinforcing materials into the polyketone polymer matrix and especially inorganic fibrous reinforcements.

SUMMARY OF THE INVENTION

It is an object of the present invention therefore to provide composites as defined hereinbefore, which possess both good mechanical properties and a good melt stability. More specifically, it is an object of the present invention to provide composites having a low cross-linking tendency, which in turn is reflected by a stable melt flow rate and a stable "cross-over-time" (time available before polymer cross-linking makes processing impossible, cf. H. H. Winter, Polymer Engineering and Science, Vol. 27(22), 1987, p. 1698).

As a result of continuing research and experimentation, it has surprisingly been found that the mechanical strength and the melt stability of composites based on glass fibers and polyketones is considerably improved when the fibers have been provided with a sizing having aminosilane and uncured epoxy resin functionalities.

Accordingly, the invention relates to a reinforced thermoplastic composite characterised by comprising a linear alternating polymer of at least one olefinically unsaturated compound and carbon monoxide, and a glass fiber reinforcement having a coating of a sizing material, wherein the sizing material has a coupling agent consisting essentially of aminosilane and uncured epoxy resin functionalities.

DETAILED DESCRIPTION OF THE INVENTION

The glass fiber reinforcement may conveniently be selected from the group comprising woven and non-woven fibrous reinforcements. Suitable non-woven fibrous reinforcements include continuous and chopped fibers.

The precise nature of the sizing agents employed in the reinforced composites of the invention is somewhat uncertain. It is considered likely that the size contains a chain up to 3 methylene groups with a silane functionality (—SiH₃) on one end and an epoxy functionality

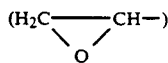

on the other. The silane functionality comprises a mono-, di- or triaminosilane group, or mixtures thereof. The triaminosilane group or mixtures having a high proportion of triaminosilane groups are preferred. The epoxy group is uncured, i.e. not (substantially) cross-linked to its neighbours. In any event, the sizing agents usefully employed in the reinforced polymers are characterised by a combination of aminosilane and uncured epoxy functionality. This combination serves to distinguish the sizing agents of the invention from other related sizing agents. A particularly suitable sizing comprises the surface coating provided on "Owens Corning 429 YZ" glass fibers.

The term "glass" is employed in the conventional meaning to indicate that class of complex metal silicates which are commonly referred to as glasses. Although the addition of rare earth metal oxides or transition metal oxides to other metal silicates on occasion will produce a glass of rather exotic properties, the glass from which the glass fiber of the invention is preferably produced in the more common alkali metal silicate glass, particularly a sodium silicate glass. Fibers produced of such glass are conventional and are commercially available from a number of glass companies. The fibers are useful as reinforcements for polymeric products and are commercially used as such. However, the physical dimensions of the glass fibers are of some importance to successful utilization in a particular application.

In the polyketone/glass fiber compositions of the invention, the glass fibers which contribute the most desirable properties to the composition are chopped glass fibers of circular cross-section. The fibers range in diameter from about 5 micron to about 20 micron, preferably from 10 to 18 micron. Fibers of greater or lesser diameter are satisfactory but fibers of too small a diameter do not provide the desired strength and fibers of too large a diameter contribute too much weight for the resulting strength and may not be economical. Although in some applications the long continuous fibers of glass are satisfactory, in the composites of the invention it is preferred to use short fibers of glass. Lengths of glass fiber from about 2.5 to about 12.5 mm are suitable. While somewhat longer or somewhat shorter lengths are also useful, too long a glass fiber detracts from the processability of the composition while too short a fiber does not provide the desired strength. It is recognised that the actual length of the glass fibers in the composition will depend to some extent upon the method of blending or mixing the components, as this may mechanically break down the length of the glass fibers. More important than fiber diameter or fiber length, however, is the fiber aspect ratio, the ratio of fiber length to diameter. The higher the aspect ratio the better the reinforcing effect. Aspect ratios of above 40 are very suitable.

Generally the method employed for the preparation of such reinforced polyketone composites is not critical as long as it provides an intimate mixture of polymer and reinforcement. In one method, the solution process which is the subject of EP-A-322959, incorporated herein by reference, may be used. Alternatively, the components are contacted in e.g. an extruder or an internal mixer at elevated temperature. This method, however, has some limitations in that it is often only possible to employ short inorganic fibers, i.e. chopped fibers, or fiber breakage may occur, while furthermore there often is a limit to the amount of fibers which can be incorporated, in view of viscosity constraints. Obviously the viscosity of such a polymer/fiber mixture may be reduced by raising the temperature, but too high a temperature may result in an unacceptable degree of polymer degradation. Very suitably the preparation is effected by feeding the polymer at an elevated temperature in an extruder onto which a second extruder is mounted near the exit which adds the glass fibers to the polymer melt in the first extruder in a controlled fashion.

The thermoplastic polymers which may be employed in the reinforced composites according to the present invention may be true copolymers of carbon monoxide and one particular olefinic compound such as an alkene of up to 12 carbon atoms, preferably ethene or an aryl substituted alkene, preferably styrene, or they can be copolymers of carbon monoxide and more than one olefin e.g. ethene and propene. In the latter case ethene is preferably employed as the main olefin. The relevant alternating copolymers are disclosed, for example in EP-A-121965, EP-A-213671, EP-A-229408 and U.S. Pat. No. 3,914,391, likewise, their methods of preparation by catalytic copolymerisation are disclosed in these references. Suitable polymerization catalysts are based upon palladium/phosphine systems.

Particularly suitable thermoplastic polymers to be employed in the composites of this invention are copolymers of ethene and carbon monoxide, terpolymers of ethene, propene and carbon monoxide, preferably those in which the ethylene to propylene molar ratio in the polymer chains is at least 3:1. Other terpolymers are terpolymers of ethylene and carbon monoxide with butene, pentene, hexene, heptene, octene, nonene, decene, dodecene, styrene, methyl acrylate, methyl methacrylate, vinyl acetate, undecenoic acid, undecenol, 6-chlorohexene, N-vinylpyrrolidone and the diethylester of vinyl-phosphonic acid, provided the molar ratio of ethylene to other unsaturated monomer in the polymer macromolecules is at least 3:1, preferably at least 8:1.

Especially preferred are thermoplastic polymers as described hereinbefore having a molecular weight which corresponds with a Limiting Viscosity Number at 60° C. (LVN 60) between 1 and 2 dl/g.

The reinforcement content of the reinforced thermoplastic composites according to the present invention may vary widely e.g. from as low as 1 to as high as 90% volume, but will generable be in the range of from about 5 to 60% volume. On a mass basis, the reinforcement content may suitably be between about 1 to about 45 wt %, based on total composition, preferably from about 5 to about 35 wt %. Said reinforcement content will be determined by the method of preparation as well as by the end use.

The composites of the invention may also include conventional additives such as stabilisers, antioxidants, mould release agents, fire retardant materials and processing aids which are designed to improve the processability of the components or reinforced polymer or to improve the properties thereof. Such additives are added prior to, together with, or subsequent to, the mixing of the sized glass fibers and polymer.

A particular useful processing aid for non-reinforced polyketone comprises a polymer containing moieties of an α-olefin and an α,β-ethylenically unsaturated carboxylic acid which optionally has been partially neutralised with metal ions. Illustrative of these polymers are the copolymers of ethylene and acrylic acid or methacrylic acid which are commercially available or the class of zinc or calcium partially neutralised corresponding polymers known as ionomers. Such materials are marketed under the trademarks "NUCREL", "PRIMACORE" and "SURLYN". A disadvantage of such processing aids, when used with non-reinforced polyketones, is a loss of mechanical strength and melt stability, but when used with polyketones reinforced with glass fibers coated with the polar sizing recommended in EP-A-322959 or other commercial fibers, generally these properties improve. It is thought that the additives both lubricate the melt and increase the degree of bonding between fibers and polymer.

However, it has been found rather surprisingly that such processing aids should preferably be absent from the reinforced composites of the present invention, because they have a negative influence both on the melt stability and on the mechanical strength. This is a further indication of the unique nature of the present sizing compared to other conventional sizings. It also presents unexpected advantages, for the costly additive can now be dispensed with, and no additional blending steps are necessary.

The invention is further illustrated by the following non-limiting example.

EXAMPLE (a) A linear alternating terpolymer of carbon monoxide, ethene and propene was prepared in the presence of a catalyst formed from palladium acetate, the anion of trifluoroacetic acid, and 1,3-bis-(diphenylphosphino)-propane. The terpolymer had a crystalline melting point of 220° C. and a limiting viscosity number of 1.1 dl/g.

(b) Blends of the terpolymer made in (a) were prepared by dry mixing of polymer nibs with short chopped glass fibers in a hopper, and subsequently extruding the mixture, thereby melting the polymer. The resulting strands were processed to nibs, which in turn were injection moulded into test strips. A total of eight composites were prepared. The first four contained only glass (30% wt) and terpolymer (70% wt). The second group of four contained glass (30% wt), terpolymer (69% wt) and "SURLYN" 9650 (1% wt). The latter compound which is a copolymer of ethylene and acrylic acid which has been partially neutralised with zinc ions, is a commercially available processing aid. All eight composites, as well as two non-reinforced samples, one with and one without the processing aid, were extruded, dried and injection moulded into standard test pieces under identical processing conditions. The glass fibers used were:

(1) OCF 429 YZ, having a sizing comprising aminosilane and uncured epoxy functionalities.
(2) PPG 22517, having a sizing comprising aminosilane and polyurethane cured epoxy functionalities, not according to the invention.
(3) OCF 492 AA, having a polar sizing, recommended in EP-A-322959, not according to the invention.
(4) OCF R23 DX1, not according to the invention.

(c) The ten test pieces were subjected to standard mechanical testing. The heat distortion temperatures (at 1.82 MPa) and flexural moduli (at 23° C.) of the reinforced samples were 213 (±2) °C. and 6.8 (±0.2) GPa respectively, irrespective of the composite formulation. The tensile yield strengths were determined according to ASTM D790 method 1, procedure B using a span to depth ratio of 16. In addition thereto, nibs of the ten samples were each subjected to a measurement of melt flow rate (at 250° C. using a 1 kg load) and of crossover-time (at 275° C. and 1 rad/sec). The results are given in Table I.

TABLE I

| Glass Type | Processing Aid [1% wt] | Melt Flow Rate [g/10 min] | Yield Strength [MPa, 23° C.] | Crossover Time [min] |
|---|---|---|---|---|
| NONE | no | 17.4 | 40.6 | 56.0 |
| 1 | no | 4.4 | 126.7 | 50.0 |
| 2 | no | 3.4 | 125.5 | 27.0 |
| 3 | no | 2.6 | 95.0 | 18.5 |
| 4 | no | 2.5 | 114.7 | 11.0 |
| NONE | yes | 11.7 | 26.4 | 49.0 |
| 1 | yes | 4.3 | 85.2 | 39.0 |
| 2 | yes | 3.2 | 127.1 | 30.0 |
| 3 | yes | 2.7 | 109.0 | 21.0 |
| 4 | yes | 2.1 | 127.1 | 10.0 |

The above data indicate that glass fibers reinforce the polyketone terpolymer. The best tensile yield strengths are obtained with glass types Nos. 1 (without processing aid), 2 (with or without processing aid) and 4 (with processing aid). The results also show the use of processing aid decreases the yield strengths of the neat terpolymer and the composite according to the invention (No. 1).

The melt stabilities of the neat terpolymer and the composite according to the invention (No. 1) are decreased by the addition of the processing aid, whereas the melt stabilities of the composites Nos. 2 and 3 are increased by such addition. The melt stability of composite No. 4, either with or without the processing aid, is unacceptably low. It is obvious that the melt stability of composite No. 1 without processing aid is best: it shows both the longest cross-over-time and the highest melt flow rate of all tested reinforced composites.

In conclusion, the results show that composite No. 1 ( without processing aid) is an improvement over the other composites. It appears to be much less able to initiate cross-linking than are the sizings on the other glass fibers tested, and so it is the easiest composite to melt process, whilst its yield strength is only 0.4 MPa less than that of the best of the other composites. Another advantage it possesses, is that the processing aid does not have to be added.

While this invention has been described in detail for purposes of illustration, it is not to be construed as limited thereby but is intended to cover all changes and modifications within the spirit and scope thereof.

What is claimed is:

1. A reinforced thermoplastic composite having and exhibiting improved melt stability comprising a linear alternating polymer of at least one olefinically unsaturated compound and carbon monoxide and a sized glass fiber reinforcement wherein as coupling agents, the sizing material consists essentially of amino silane and uncured epoxy resin functionalities.

2. A composition as in claim 1 wherein said linear alternating polymer is an ethene/carbon monoxide copolymer or an ethene/propene/carbon monoxide terpolymer having an ethene to propene molar ratio of at least 3:1.

3. A composition as in claim 1 wherein processing aids, such as a copolymer of an $\alpha,\beta$-ethylenically unsaturated carboxylic acid which optionally has been neutralized partially with metal ions, are substantially absent.

4. A composition as in claim 1 wherein said sized glass fiber reinforcement is present in an amount of from about 5 to about 50% volume based on total composition.

5. A composition as in claim 1 wherein said sized glass fiber reinforcement is present in an amount of from about 1 to about 45% wt based on total composition.

6. A composition as in claim 1 wherein said glass fibers are chopped glass fibers of circular cross-section.

7. A composition as in claim 6 wherein said chopped glass fibers have a diameter in the range of from 5 to 20 microns.

8. A composition as in claim 7 wherein said chopped glass fibers have a diameter in the range of from 10 to 18 microns.

9. A composition as in claim 6 wherein said glass fiber has a length of from about 2.5 to 12.5 mm.

10. A composition as in claim 6 wherein said glass fiber has an aspect ratio of at least 40.

11. A process for improving the melt stability of copolymer comprising a linear alternating polymer of carbon monoxide and at least one ethylenically unsaturated compound comprising the addition thereto of a sized glass fiber wherein as coupling agents, the sizing material consists essentially of amino silane and uncured epoxy resin functionalities.

12. A process as in claim 11 wherein said sized glass fiber reinforcement is present in an amount of from about 5 to about 50% volume based on total composition.

13. A process as in claim 11 wherein said sized glass fiber reinforcement is present in an amount of from about 1 to about 45% wt based on total composition.

14. A shaped article of manufacture produced from the composition of claim 1.

* * * * *